US012722090B2

(12) United States Patent
Hui et al.

(10) Patent No.: US 12,722,090 B2
(45) Date of Patent: Sep. 1, 2026

(54) RACKET BALL GAME METHOD AND APPARATUS BASED ON A HEAD-MOUNTED DEVICE, AND DEVICE

(71) Applicant: GOERTEK INC., Shandong (CN)

(72) Inventors: Shangning Hui, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 712 days.

(21) Appl. No.: 18/249,350

(22) PCT Filed: Sep. 23, 2021

(86) PCT No.: PCT/CN2021/119727

§ 371 (c)(1),
(2) Date: Apr. 17, 2023

(87) PCT Pub. No.: WO2022/083388

PCT Pub. Date: Apr. 28, 2022

(65) Prior Publication Data

US 2023/0405474 A1 Dec. 21, 2023

(30) Foreign Application Priority Data

Oct. 21, 2020 (CN) ......................... 202011134361.7

(51) Int. Cl.
*A63F 13/812* (2014.01)
*A63F 13/212* (2014.01)
*A63F 13/5255* (2014.01)

(52) U.S. Cl.
CPC .......... *A63F 13/812* (2014.09); *A63F 13/212* (2014.09); *A63F 13/5255* (2014.09); *A63F 2300/105* (2013.01); *A63F 2300/8082* (2013.01)

(58) Field of Classification Search
CPC ............ A63F 13/812; A63F 2300/8011; A63F 2300/8082
See application file for complete search history.

(56) References Cited

U.S. PATENT DOCUMENTS 8,654,073 B2 * 2/2014 Konishi ................ A63F 13/428 345/156
8,654,996 B2 * 2/2014 Yao ........................ H04R 19/04 381/174

(Continued)

FOREIGN PATENT DOCUMENTS

CN 101991949 A 3/2011
CN 104267833 A 1/2015

(Continued)

OTHER PUBLICATIONS

"Tennis Kings VR," accessed Dec. 19, 2025. Source: https://store.steampowered.com/app/802320/Tennis_Kings_VR/ (Year: 2025).*

(Continued)

*Primary Examiner* — Steven J Hylinski
(74) *Attorney, Agent, or Firm* — Ingrassia Fisher & Lorenz, LLP

(57) ABSTRACT

A racket ball game method includes displaying a virtual court and displaying a virtual ball in the virtual court; determining a human body posture according to a relative position of a first handle and the head-mounted device; searching a target movement velocity ratio matching with the human body posture from a mapping relationship according to the human body posture; acquiring a movement trajectory of a second handle in a coordinate system of a head-mounted device; determining a virtual movement trajectory of the second handle in the virtual court according to the movement trajectory of the second handle in the coordinate system of the head-mounted device and the target movement velocity ratio; and determining a movement (Continued)

trajectory of the virtual ball according to the virtual movement trajectory and the movement trajectory of the virtual ball, and displaying the virtual ball according to the movement trajectory of the virtual ball.

20 Claims, 4 Drawing Sheets

(56) References Cited

U.S. PATENT DOCUMENTS

| | | | | |
|---|---|---|---|---|
| 10,204,456 | B2 | 2/2019 | Kudirka et al. | |
| 2002/0021283 | A1 | 2/2002 | Rosenberg et al. | |
| 2005/0255900 | A1 * | 11/2005 | Takahashi | A63F 13/573 463/3 |
| 2016/0279496 | A1 | 9/2016 | Lee et al. | |
| 2018/0021653 | A1 * | 1/2018 | Thornbrue | A63B 69/3685 473/453 |
| 2019/0217171 | A1 | 7/2019 | Ho et al. | |
| 2019/0392554 | A1 | 12/2019 | Andersson | |

FOREIGN PATENT DOCUMENTS

| | | | | |
|---|---|---|---|---|
| CN | 105006008 | A | 10/2015 | |
| CN | 106200927 | A | 12/2016 | |
| CN | 106778477 | A | 5/2017 | |
| CN | 107168522 | A | 9/2017 | |
| CN | 107273857 | A | 10/2017 | |
| CN | 109316741 | A | 2/2019 | |
| CN | 110215685 | A | 9/2019 | |
| CN | 110603573 | A | 12/2019 | |
| CN | 111160166 | A | 5/2020 | |
| CN | 112370795 | A | 2/2021 | |
| JP | 2010233751 | A * | 10/2010 | |
| JP | 2010233752 | A * | 10/2010 | |
| JP | 2018157987 | A | 10/2018 | |
| KR | 20190053278 | A * | 5/2019 | G02B 27/0093 |

OTHER PUBLICATIONS

"Silicon Mirage: The Art and Science of Virtual Reality," pp. 198-199, by Aukstakalnis et al. Copyright 1992. (Year: 1992).*

* cited by examiner start displaying a virtual sport court and displaying a virtual ball in the virtual sport court — S2100 determining a human body posture according to a relative position of a first handle and the head-mounted device — S2200 searching a target movement velocity ratio matching with the human body posture from a mapping relationship according to the human body posture — S2300 acquiring a movement trajectory of a second handle in a coordinate system of the head-mounted device — S2400 determining a virtual movement trajectory of the second handle in the virtual sport court according to the movement trajectory of the second handle in the coordinate system of the head-mounted device and the target movement velocity ratio — S2500 determining a movement trajectory of the virtual ball according to the virtual movement trajectory and the movement trajectory of the virtual ball, and displaying the virtual ball according to the movement trajectory of the virtual ball — S2600 end

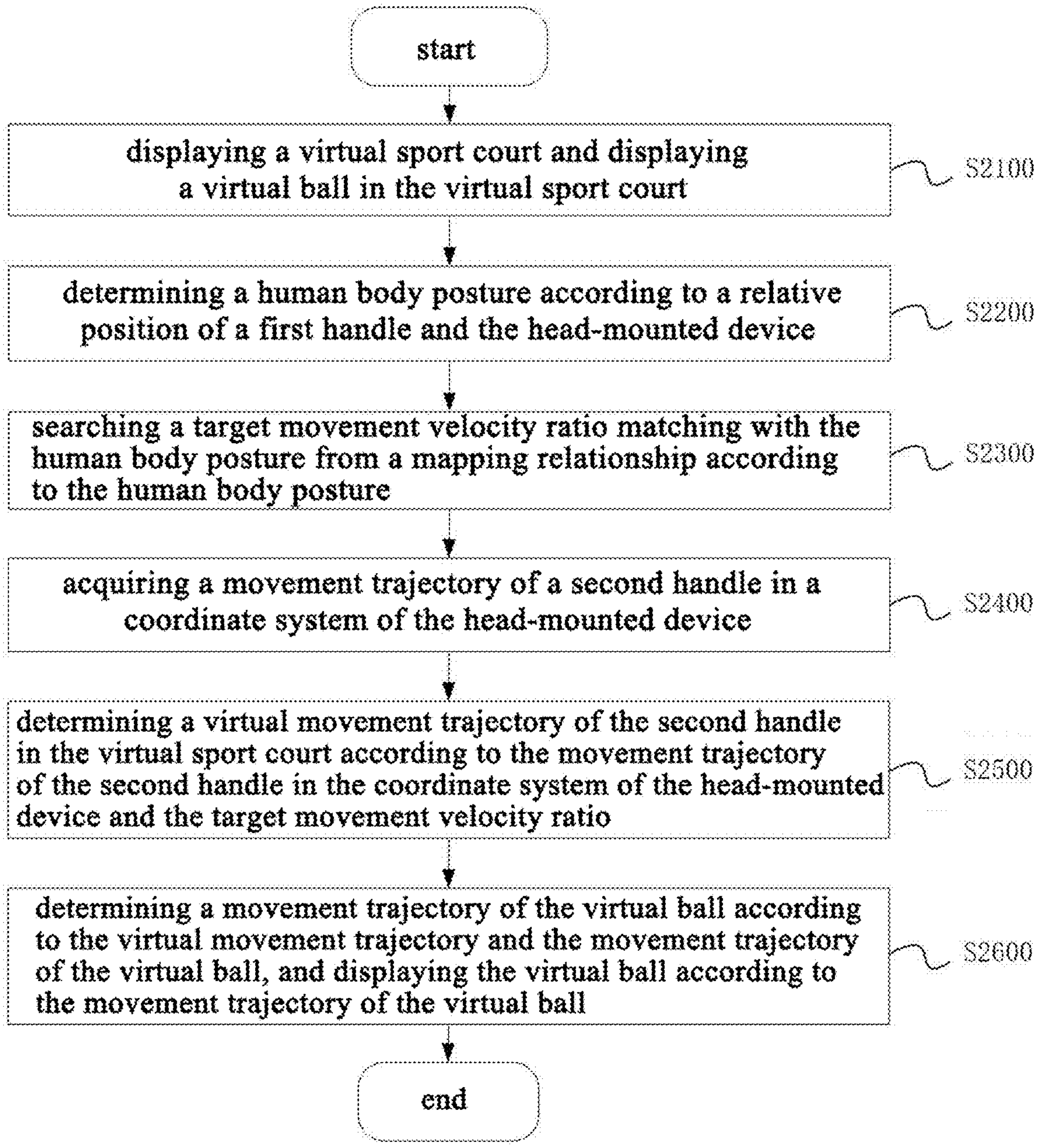

Fig. 2

Fig. 3

RACKET BALL GAME METHOD AND APPARATUS BASED ON A HEAD-MOUNTED DEVICE, AND DEVICE

CROSS-REFERENCE TO RELATED APPLICATION

This application is a U.S. National-Stage entry under 35 U.S.C. § 371 based on International Application No. PCT/CN2021/119727, filed Sep. 23, 2021 which was published under PCT Article 21(2) and which claims priority to Chinese Application No. 202011134361.7, filed Oct. 21, 2020, which are all hereby incorporated herein in their entirety by reference.

TECHNICAL FIELD

This application pertains to the technical field of wearable devices, and more specifically, it relates to a racket ball game method based on a head-mounted device, a racket ball game apparatus based on a head-mounted device, an electronic device and a computer-readable storage medium.

BACKGROUND

Badminton has become one of the most popular sports in the world. Playing badminton need a relatively large court. For example, the badminton court size for singles is 13.4 meters long and 5.18 meters wide.

However, due to the lack of courts, many people who are interested in badminton cannot play it. In addition, other objects, desirable features and characteristics will become apparent from the subsequent summary and detailed description, and the appended claims, taken in conjunction with the accompanying drawings and this background.

SUMMARY

An object of the present disclosure is to provide a new technical solution for playing racket ball game based on a head-mounted device.

According to a first aspect of the present disclosure, a racket ball game method based on a head-mounted device is provided, which comprises:

displaying a virtual sport court and displaying a virtual ball in the virtual sport court;

determining a human body posture according to a relative position of a first handle and the head-mounted device;

searching a target movement velocity ratio matching with the human body posture from a mapping relationship according to the human body posture;

acquiring a movement trajectory of a second handle in a coordinate system of the head-mounted device;

determining a virtual movement trajectory of the second handle in the virtual sport court according to the movement trajectory of the second handle in the coordinate system of the head-mounted device and the target movement velocity ratio; and determining a movement trajectory of the virtual ball according to the virtual movement trajectory and the movement trajectory of the virtual ball, and displaying the virtual ball according to the movement trajectory of the virtual ball.

Optionally, the step of displaying the virtual sport court comprises:

acquiring a position of a standard point, an actual length and width of an environmental site, and a magnification rate of the environmental site; and displaying the virtual sport court according to the position of the standard point, the actual length and width of the environmental site, and the magnification rate of the environmental site.

Optionally, the step of acquiring a movement trajectory of the second handle in the coordinate system of the head-mounted device comprises:

acquiring a movement trajectory of the head-mounted device;

determining a movement trajectory of the second handle relative to the head-mounted device according to the relative position of the second handle and the head-mounted device and the movement trajectory of the head-mounted device; and determining the movement trajectory of the second handle in the coordinate system of the head-mounted device according to the movement trajectory of the head-mounted device and the movement trajectory of the second handle relative to the head-mounted device.

Optionally, the method further comprises:

displaying the mapping relationship;

receiving a modification instruction to modify the mapping relationship; and updating the mapping relationship according to the modification instruction.

Optionally, the method further comprises:

when it is determined that a hitting action is completed, displaying prompt message indicating to return to a target position of the virtual sport court according to the position of the head-mounted device.

Optionally, the method further comprises:

before the position of the head-mounted device is not at the target position of the virtual sport court, correcting the target movement velocity ratio to be a target movement velocity ratio when moving from the center position to the hitting position last time.

Optionally, the method further comprises:

at an initial moment of displaying the virtual sport court, determining boundary lines of the virtual sport court according to a distance between the position of the head-mounted device and the ground; and determining whether the virtual ball is out of bounds according to the movement trajectory of the virtual ball and the boundary lines of the virtual sport court.

According to a second aspect of the present disclosure, an apparatus for playing racket ball game based on a head-mounted device is provided, which comprises:

a first display module configured to display a virtual sport court and display a virtual ball in the virtual sport court;

a first determination module configured to determine a human body posture according to a relative position of a first handle and the head-mounted device;

a search module configured to search a target movement velocity ratio matching with the human body posture from a mapping relationship according to the human body posture;

an acquisition module configured to acquire a movement trajectory of a second handle in a coordinate system of the head-mounted device;

a second determination module configured to determine a virtual movement trajectory of the second handle in the virtual sport court according to the movement trajectory of the second handle in the coordinate system of the head-mounted device and the target movement velocity ratio; and a second display module configured to determine a movement trajectory of the virtual ball according to the virtual movement trajectory and the movement trajectory of the virtual ball, and display the virtual ball according to the movement trajectory of the virtual ball.

According to a third aspect of the present disclosure, an electronic device is provided. The electronic device comprises a first handle, a second handle, and a head-mounted device. The head-mounted device comprises the apparatus as described in the second aspect; or the head-mounted device comprises a memory and a processor, the memory is configured to store computer instructions, and the processor is configured to call the computer instructions from the memory to execute any one of the methods described in the first aspect.

According to a fourth aspect of the present disclosure, a computer-readable storage medium is provided, on which a computer program is stored. When the computer program is executed by a processor, any one of the methods described in the first aspect is implemented.

In the embodiment of the present disclosure, the virtual sport court and the virtual ball in the virtual sport court are displayed; the human body posture are determined according to the relative position of the first handle and the head-mounted device; the target movement velocity ratio matching with the human body posture is searched from the mapping relationship (according to the human body posture); the movement trajectory of the second handle in the coordinate system of the head-mounted device is acquired; the virtual movement trajectory of the second handle in the virtual sport court is determined according to the movement trajectory of the second handle in the coordinate system of the head-mounted device and the target movement velocity ratio; and the movement trajectory of the virtual ball is determined according to the virtual movement trajectory and the movement trajectory of the virtual ball, and the virtual ball is displayed according to the movement trajectory of the virtual ball. In this way, the head-mounted device can display the virtual sport court and launch the virtual ball. The user adjusts the relative position of the first handle and the head-mounted device, and performs the hitting action through the second handle. Based on the relative position of the first handle and the head-mounted device, the head-mounted device determines the target movement velocity ratio, and enlarges the movement trajectory of the second handle (equivalent to the racket) in the coordinate system of the head-mounted device in the virtual sport court through the target movement velocity ratio to obtain the virtual movement trajectory. On this basis, in combination with the movement trajectory of the virtual ball, the racket ball game that need a large sport court can be realized in a small environmental site. In this way, the problem that users cannot play racket ball game due to the lack of sport courts can be solved.

Other features and advantages of the present disclosure will become clearer by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and:

FIG. 2 is a flow chart of a racket ball game method based on a head-mounted device according to an embodiment of the present disclosure;

FIG. 3 is a schematic diagram of a human body posture according to an embodiment of the present disclosure;

DETAILED DESCRIPTION

Figure 1:
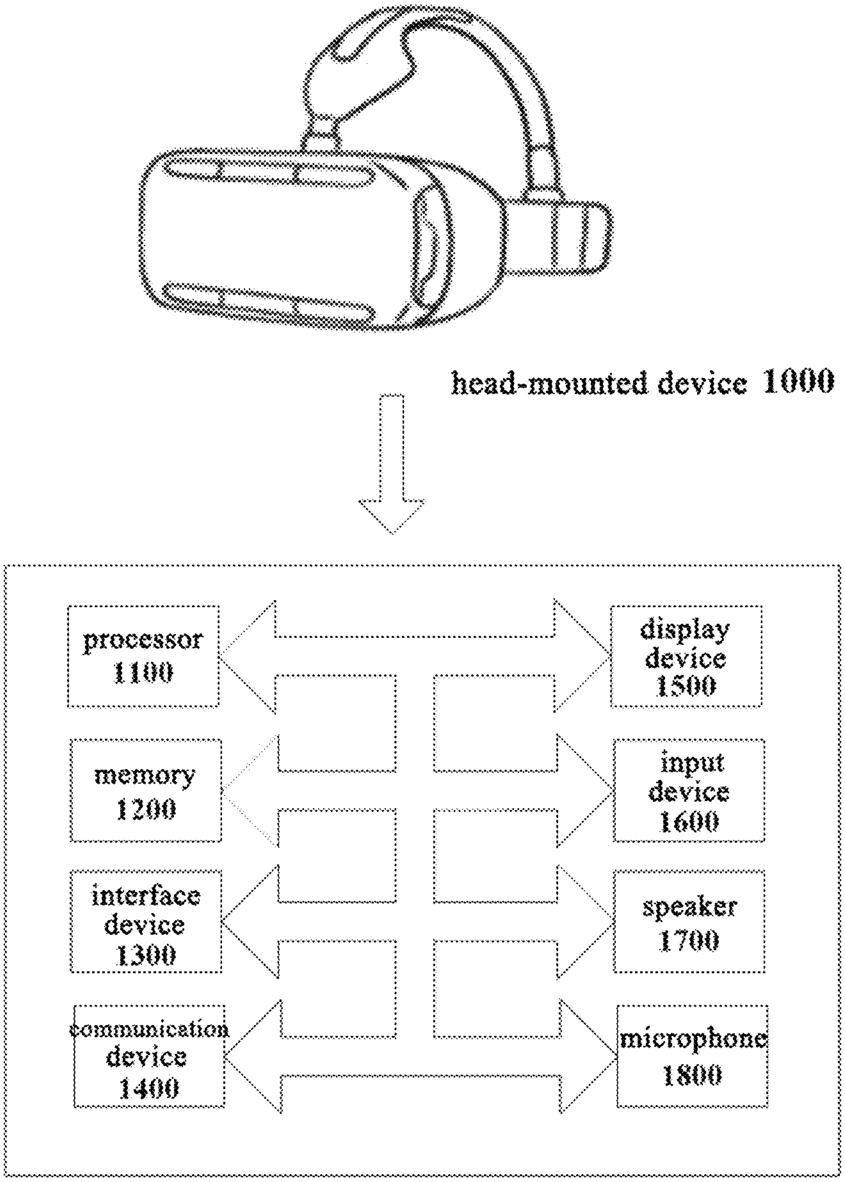
FIG. 1 is a block diagram of the hardware configuration of a head-mounted device that implements a racket ball game method based on a head-mounted device according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various exemplary embodiments of the present disclosure will be described in detail with reference to the accompanying drawings. It should be noted that, unless specified otherwise, the arrangements of the members and steps, mathematical formulas and numerical values described in these embodiments do not restrict the scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail. However, when applicable, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

Hardware Configuration Embodiment

FIG. 1 is a block diagram of the hardware configuration of a head-mounted device that implements a racket ball game method based on a head-mounted device according to an embodiment of the present disclosure. The head-mounted device may be a VR head-mounted device or an MR head-mounted device, etc.

The head-mounted device 1000 may comprise: a processor 1100, a memory 1200, an interface device 1300, a communication device 1400, a display device 1500, an input device 1600, a speaker 1700, a microphone 1800, etc. The processor 1100 may be a central processor CPU, microprocessor MCU, etc. The memory 1200 includes, for example, ROM (read only memory), RAM (random access memory), non-volatile memory such as a hard disk, etc. The interface device 1300 includes, for example, a USB interface, a headphone interface, etc. The communication device 1400 can, for example, perform wired or wireless communication. The display device 1500 is, for example, a liquid crystal display screen, a touch screen, etc. The input device 1600 may include, for example, a touch screen, a keyboard, etc. Users can input/output voice information through speaker 1700 and microphone 1800.

Although a plurality of devices are shown for the head-mounted device 1000 in FIG. 1, the present disclosure may only involve some of them, for example, the head-mounted device 1000 only involves the memory 1200 and the processor 1100.

When it is applied to the embodiments of the present disclosure, the memory 1200 of the VR head-mounted device 1000 is used to store instructions, which are used to control the processor 1100 to execute the racket ball game method based on the head-mounted device according to the embodiments of the present disclosure.

In the above description, technicians can design instructions according to the solution disclosed in the present disclosure. How the instructions control the processor to operate is well known in the art, so it will not be described in detail here.

Method Embodiment

The embodiment of the present disclosure provides a racket ball game method based on a head-mounted device. The executive body of the method can be the head-mounted device as shown in FIG. 1. In addition, the racket ball game mentioned in the embodiment of the present disclosure may be any one of badminton, table tennis, tennis, etc.

As shown in FIG. 2, the racket ball game method based on a head-mounted device according to the embodiment of the present disclosure comprises the following steps S2100-S2600:

S2100, displaying a virtual sport court and displaying a virtual ball in the virtual sport court;

In the embodiment of the present disclosure, the head-mounted device can display the virtual sport court in the following two ways.

In the first way, at the start moment of implementing the racket ball game method based on a head-mounted device according to the embodiment of the present disclosure, the position of the head-mounted device is taken as the position of a designated point of the virtual sport court. Alternatively, a button is provided on the head-mounted device, and the position of the head-mounted device at the moment of triggering the button is taken as the position of the designated point of the virtual sport court. A virtual sport court of a default size is displayed according to the designated point of the virtual sport court.

The designated point may be the center point of the virtual sport court, any corner point of the virtual sport court, etc. The size of the virtual sport court may be the same as that of the standard racket sport court. Of course, the size of the virtual sport court may also be different from that of the standard racket sport court. For example, the size of the virtual sport court may be larger than the size of the standard racket sport court, and in this way, it becomes possible for users to play racket ball game even in a small site.

In the second way, it is realized through the following steps S2110 and S2111:

S2110, acquiring a position of a standard point, an actual length and width of an environmental site, and a magnification rate of the environmental site.

In the embodiment of the present disclosure, the position of the standard point may be the position of the head-mounted device at the start moment of implementing the racket ball game method based on a head-mounted device according to the embodiment of the present disclosure, or the position of the head-mounted device at the time of triggering the button which is provided on the head-mounted device.

The actual length and width of the environmental site and the magnification rate of the environmental site are manually entered by the user in text or voice into the head-mounted device.

In an example, the head-mounted device is equipped with multiple buttons representing different magnification rates of the environmental sites, and the user can manually select one of the buttons. The head-mounted device takes the magnification rate of the environmental site corresponding to the button selected by the user as the magnification rate of the environmental site in the above S2110.

S2111, displaying the virtual sport court according to the position of the standard point, the actual length and width of the environmental site, and the magnification rate of the environmental site.

In the embodiment of the present disclosure, the head-mounted device first determines the size of the virtual sport court according to the actual length and width of the environmental site and the magnification rate of the environmental site. Specifically, the product of the length of the environmental site and the magnification rate of the environmental site is determined as the length of the virtual sport court. The product of the width of the environment site and the magnification rate of the environment site is determined as the width of the virtual sport court. The size of the virtual sport court is determined by the length and width of the virtual sport court.

The standard point may be the center point of the virtual sport court, any corner point of the virtual sport court, etc. On this basis, the virtual sport court is displayed according to the standard point and the size of the virtual sport court.

In an example, if the standard point is the center point of the virtual sport court, the user will see that he or she is in the center of the virtual sport court through the head-mounted device after executing the above S2100.

In the embodiment of the present disclosure, displaying the virtual ball in the virtual sport court means displaying the video of launching the ball according to the default track of serving the ball in the head-mounted device.

S2200, determining a human body posture according to a relative position of a first handle and the head-mounted device.

In the embodiment of the present disclosure, the position of the head-mounted device represents the position of the user's head. The user's non-racket-holding hand holds the first handle. That is to say, the relative position of the first handle and the head-mounted device can represent the relative position of the user's non-racket-holding hand and the user's head. Based on the relative position of the first handle and the head-mounted device, the human body posture can be determined.

In an embodiment of the present disclosure, a TOF camera may be provided on the head-mounted device, and the TOF camera collects the image in the direction of the first handle. The head-mounted device determines the relative position of the first handle and the head-mounted device based on the image collected by the TOF camera. Of course, the relative position of the first handle and the head-mounted device may also be determined by other ways, which is not limited in the present disclosure.

Figure 4:
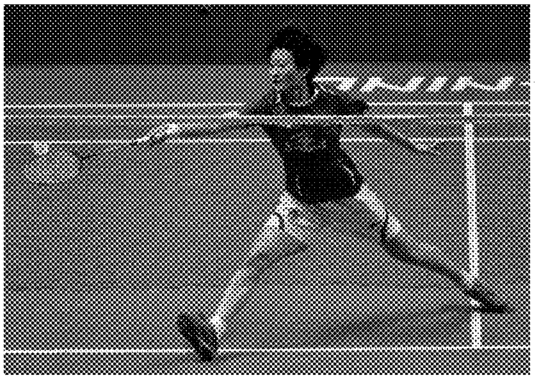
FIG. 4 is a schematic diagram of another human body posture according to an embodiment of the present disclosure.

Taking the badminton as an example of the racket ball game, it can be understood that the human body posture obtained by the above S2200 is the posture generated by the user in the process of playing badminton. In this example, the human body posture may include: the human body stands in a normal state with arms relaxed; the non-racket-holding arm is horizontal, and the racket-holding arm is in the shape of hitting the ball (for example, as shown in FIG. 3); the non-racket-holding arm drops, and the human body runs (for example, as shown in FIG. 4); the human body squats and then jumps.

S2300, searching a target movement velocity ratio matching with the human body posture from a mapping relationship according to the human body posture.

In the embodiment of the present disclosure, movement velocity ratios corresponding to different human body postures are stored in the mapping relationship. The human body posture in the mapping relationship is the posture related to shuttlecock hitting and generated by the user in the process of playing badminton.

In the embodiment of the present disclosure, the establishment principle of the mapping relationship in the above S2300 may be as follows: when the human body posture represents the user's horizontal movement, the corresponding movement velocity ratio is set to be greater than 1; when the human body posture represents the user's non-horizontal movement (such as keeping still, jumping, etc.), the corresponding movement velocity ratio is set to 1. It should be noted that the movement velocity ratios in the mapping relationship in the above S2300 are all greater than or equal to 1.

The specific implementation of the above S2300 may be as follows: searching a movement velocity ratio corresponding to a human body posture that is the same as the human body posture obtained by the above S2200 in the mapping relationship, and taking the movement velocity ratio found as the target movement velocity ratio. In an example, the above mapping relationship may be embodied in the form of tables.

S2400, acquiring a movement trajectory of a second handle in a coordinate system of the head-mounted device.

In the embodiment of the present disclosure, the user's racket-holding hand holds the second handle. At the same time, the head-mounted device renders the second handle into a racket.

In an embodiment of the present disclosure, the above S2400 can be realized through the following S2410-S2430:

S2410, acquiring a movement trajectory of the head-mounted device.

In an embodiment of the present disclosure, the specific implementation of the S2410 may be as follows: an acceleration sensor and a gyroscope are installed on the head-mounted device; according to the detection information of the acceleration sensor and the gyroscope, the movement trajectory of the head-mounted device is determined.

In another embodiment of the present disclosure, the specific implementation of S2410 may also be as follows: the head-mounted device records the current position and a historical position at the previous moment; according to the current position and the historical position, the movement trajectory of the head-mounted device is determined.

S2411, determining a movement trajectory of the second handle relative to the head-mounted device according to the relative position of the second handle and the head-mounted device and the movement trajectory of the head-mounted device.

S2412, determining the movement trajectory of the second handle in the coordinate system of the head-mounted device according to the movement trajectory of the head-mounted device and the movement trajectory of the second handle relative to the head-mounted device.

In the embodiment of the present disclosure, the movement trajectory of the second handle in the coordinates of the head-mounted device can be obtained by superimposing the movement trajectory of the second handle relative to the head-mounted device on the movement trajectory of the head-mounted device.

In an embodiment of the present disclosure, the specific implementation of determining the movement trajectory of the second handle relative to the head-mounted device may also be as follows: acquiring the relative position of the second handle and the head-mounted device at the current moment, and the relative position of the second handle and the head-mounted device at the previous historical moment; according to the relative position at the current moment and the relative position at the previous historical moment, determining the movement trajectory of the second handle relative to the head-mounted device.

S2500, determining a virtual movement trajectory of the second handle in the virtual sport court according to the movement trajectory of the second handle in the coordinate system of the head-mounted device and the target movement velocity ratio.

In the embodiment of the present disclosure, the specific implementation of the S2500 is as follows: the product of the target movement velocity ratio and the movement trajectory of the second handle in the head-mounted coordinate system is taken as the virtual movement trajectory of the second handle in the virtual sport court. Based on the above S2300, it can be seen that the target movement velocity ratio is greater than or equal to 1. Therefore, after executing the above S2500, the movement trajectory of the second handle in the head-mounted coordinate system can be enlarged. In this way, the head-mounted device can enlarge the user's actual movement trajectory in the head-mounted device, and thus the racket ball game can be realized in a small environmental site.

S2600, determining a movement trajectory of the virtual ball according to the virtual movement trajectory and the movement trajectory of the virtual ball, and displaying the virtual ball according to the movement trajectory of the virtual ball.

In the embodiment of the present disclosure, according to the virtual movement trajectory and the movement trajectory of the virtual ball, it can be determined whether the virtual ball is hit. In the case of being hit, the angle and strength of the racket represented by the second handle can be calculated according to the virtual movement trajectory, and then the movement trajectory of the virtual ball after being hit can be determined. On this basis, the head-mounted device displays the virtual ball according to the movement trajectory. Correspondingly, in the case of not being hit, the virtual ball will continue to be displayed according to the service trajectory of the virtual ball.

In the embodiment of the present disclosure, the virtual sport court and the virtual ball in the virtual sport court are displayed; the human body posture are determined according to the relative position of the first handle and the head-mounted device; the target movement velocity ratio matching with the human body posture is searched from the mapping relationship according to the human body posture; the movement trajectory of the second handle in the coordinate system of the head-mounted device is acquired; the virtual movement trajectory of the second handle in the virtual sport court is determined according to the movement trajectory of the second handle in the coordinate system of the head-mounted device and the target movement velocity ratio; and the movement trajectory of the virtual ball is determined according to the virtual movement trajectory and the movement trajectory of the virtual ball, and the virtual ball is displayed according to the movement trajectory of the virtual ball. In this way, the head-mounted device can display the virtual sport court and launch the virtual ball. The user adjusts the relative position of the first handle and the head-mounted device, and performs the hitting action through the second handle. Based on the relative position of the first handle and the head-mounted device, the head-mounted device determines the target movement velocity ratio, and enlarges the movement trajectory of the second handle (equivalent to the racket) in the coordinate system of the head-mounted device in the virtual sport court through the target movement velocity ratio to obtain the virtual movement trajectory. On this basis, in combination with the movement trajectory of the virtual ball, the racket ball game that need a large sport court can be realized in a small environmental site. In this way, the problem that users cannot play racket ball game due to the lack of sport courts can be solved.

On the basis of any of the above embodiments, the racket ball game method based on a head-mounted device according to the embodiment of the present disclosure further comprises the following S2710-S2730:

S2710, displaying the mapping relationship;

S2720, receiving a modification instruction to modify the mapping relationship; and

S2730, updating the mapping relationship according to the modification instruction.

In the embodiment of the present disclosure, the head-mounted device can display the mapping relationship when triggered by the user. The users can manually adjust the value of the movement velocity ratio corresponding to the human body posture in the mapping relationship according to their own experience. For example, the table reflecting the mapping relationship is edited, then the movement velocity ratio to be adjusted is selected, and then the movement velocity ratio that meets the user's own needs is entered and saved. The head-mounted device recognizes the operation of inputting a movement velocity ratio meeting the user's own needs as a modification instruction. The head-mounted device updates the mapping relationship based on the modification instruction.

In the embodiment of the present disclosure, the mapping relationship supports the user's manual modification, which facilitates improving the user experience of playing racket ball game.

On the basis of any of the above embodiments, the racket ball game method based on a head-mounted device according to the embodiment of the present disclosure further comprises the following S2800:

S2800, when it is determined that a hitting action is completed, displaying prompt message indicating to return to a target position of the virtual sport court according to the position of the head-mounted device.

In the embodiment of the present disclosure, the target position refers to the serving position in the virtual sport court. It can be understood that when the virtual sport court is fixed, the target position is also fixed. In the racket ball game, the user needs to return to the target position of the sport court after completing the hitting action, so when it is determined that the user completes the hitting action, that is, when the head-mounted device determines the virtual ball contacted the second handle, or when it is determined that the virtual ball lands on the user's side, the head-mounted device displays prompt message indicating the user to return to the target position of the virtual sport court based on the current position of the head-mounted device and the target position of the virtual sport court. The prompt message may be picture and text or voice. Take the picture and text as an example, the prompt message may be an arrow indicating the direction from the current position of the head-mounted device to the above target position.

On the basis of the previous embodiment, the racket ball game method based on a head-mounted device according to the embodiment of the present disclosure further comprises the following S2900:

S2900, before the position of the head-mounted device is not at the center position of the virtual sport court, correcting the target movement velocity ratio to be a target movement velocity ratio when moving from the target position to the hitting position last time.

In the embodiment of the present disclosure, after the above S2800, before the current position of the head-mounted device is not at the target position of the virtual sport court, that is, before the user returns to the target position, it is necessary to correct the movement velocity ratio to the movement velocity ratio when moving from the target position to the hitting position last time. This is because, in order to complete the hitting action, the user needs to move to the hitting position from the target position. At this moment, the human body posture is that the non-racket-holding arm drops and the human body is running, and the movement velocity ratio is a movement velocity ratio matching with the human body posture with the dropping non-holding arm and the running human body. When the user returns to the center position from the hitting position after completing the hitting action, the user's human body posture may change. At this moment, if the correction of the above S2900 is not performed, the user will be in the target position of the virtual sport court in the head-mounted device, but not in the service position where the user hit the ball last time. This will lead to the change of the environment site, and thus the stability of playing racket ball game is reduced. Therefore, the implementation of the above S2900 can ensure the stability of the environmental site, and thus improves the stability of playing racket ball game.

On the basis of any of the above embodiments, the racket ball game method based on a head-mounted device according to the embodiment of the present disclosure further comprises the following S3110 and S3120:

S3110, at an initial moment of displaying the virtual sport court, determining boundary lines of the virtual sport court according to a distance between the position of the head-mounted device and the ground.

In the embodiment of the present disclosure, assume that at the initial moment of displaying the virtual sport court, the position of the head-mounted device represents the position of the center point (0, 0, 0) of the virtual sport court, the length of the virtual sport court is a, the width of the virtual sport court is b, and the distance between the position of the head-mounted device and the ground is c, as an example, the specific implementation of the above S3110 is: the connecting lines between two adjacent points in the points ($-\frac{1}{2}b$, $-\frac{1}{2}a$, $-c$), ($\frac{1}{2}b$, $-\frac{1}{2}a$, $-c$), ($\frac{1}{2}b$, $\frac{1}{2}a$, $-c$), and ($-\frac{1}{2}b$, $\frac{1}{2}a$, $-c$)

serve as four boundary lines of the virtual sport court. It can be understood that (−½b, −½a, −c), (½b, −½a, −c), (½b, ½a, −c) and (−½b, ½a, −c) are four corner points of the virtual sport court.

S3120, determining whether the virtual ball is out of bounds according to the movement trajectory of the virtual ball and the boundary lines of the virtual sport court.

In the embodiment of the present disclosure, the landing position of the virtual ball can be determined according to the movement trajectory of the virtual ball. Based on the landing position and the boundary lines of the virtual sport court, it can be determined whether the virtual ball is out of bounds. In an example, when the virtual ball is determined to be out of bounds, the prompt message of hitting failure may be output.

In the embodiment of the present disclosure, it is possible to judge whether the virtual ball is out of bounds, which improves the user's immersion in playing racket ball game based on a head-mounted device.

On the basis of any of the above embodiments, the racket ball game method based on a head-mounted device according to the embodiment of the present disclosure further comprises the following S3210-S3230:

- S3210, judging whether the head-mounted device is outside the boundary lines of the virtual sport court according to the position of the head-mounted device and the virtual sport court;
- S3220, detecting a distance between the head-mounted device and the boundary lines of the virtual sport court in case of not going outside the boundary lines; and
- S3230, when the distance is less than a preset threshold, outputting a prompt message of having a risk of going outside the boundary lines.

In the embodiment of the present disclosure, since the position of the head-mounted device can reflect the current position of the user, whether the head-mounted device is outside the boundary lines of the virtual sport court can reflect whether the user is outside the area of the virtual sport court. When it is judged that the head-mounted device goes outside the boundary lines of the virtual sport court, that is, the user goes outside the boundary lines of the virtual sport court, the user is judged to have crossed the boundary. At this moment, the head-mounted device outputs a prompt message of crossing the boundary to prompt the user to return to the virtual sport court.

When it is judged that the head-mounted device does not go outside the boundary lines of the virtual sport court, continue to judge the distance between the head-mounted device and the boundary lines of the virtual sport court. When the distance is less than a preset threshold, the head-mounted device determines that the user is at risk of crossing the boundary lines. At this moment, the head-mounted device outputs a prompt message that there is a risk of crossing the boundary lines.

The prompt message of crossing the boundary lines and the prompt message of risk of crossing the boundary lines can be realized in the form of sound and light, as long as the contents of the two prompt messages are different. In addition, the preset threshold can be set according to the user experience.

In addition, when the above distance is less than the preset threshold, different levels of prompt message of risk of crossing the boundary can be given for different distance ranges. For example, when a distance range indicates being closer to the boundary lines of the virtual sport court, the text color of the corresponding prompt message of risk of crossing the boundary will be darker, or the voice of the corresponding prompt message of risk of crossing the boundary will be louder.

Apparatus Embodiment

Figure 5:
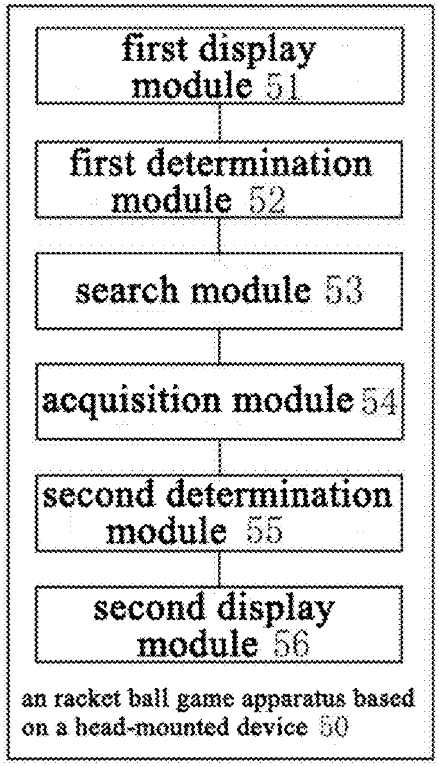
FIG. 5 is a schematic diagram of the structure of a racket ball game apparatus based on a head-mounted device according to the embodiment of the present disclosure.
Figure 6:
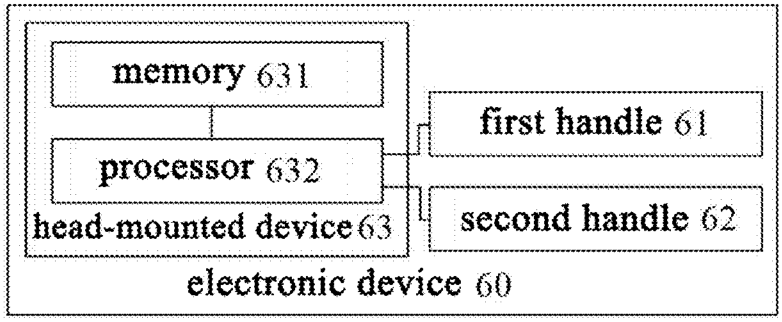
FIG. 6 is a schematic diagram of the structure of an electronic device according to an embodiment of the present disclosure.

The embodiment of the present disclosure provides a racket ball game apparatus 50 based on a head-mounted device, as shown in FIG. 5, which comprises: a first display module 51, a first determination module 52, a search module 53, an acquisition module 54, a second determination module 55 and a second display module 56.

The first display module 51 is configured to display a virtual sport court and display a virtual ball in the virtual sport court.

The first determination module 52 is configured to determine a human body posture according to a relative position of a first handle and the head-mounted device.

The search module 53 is configured to search a target movement velocity ratio matching with the human body posture from a mapping relationship according to the human body posture.

The acquisition module 54 is configured to acquire a movement trajectory of a second handle in a coordinate system of the head-mounted device.

The second determination module 55 is configured to determine a virtual movement trajectory of the second handle in the virtual sport court according to the movement trajectory of the second handle in the coordinate system of the head-mounted device and the target movement velocity ratio.

The second display module 56 is configured to determine a movement trajectory of the virtual ball according to the virtual movement trajectory and the movement trajectory of the virtual ball, and display the virtual ball according to the movement trajectory of the virtual ball.

In an embodiment, the first display module 51 comprises an acquisition unit and a display unit.

The acquisition unit is configured to acquire a position of a standard point, an actual length and width of an environmental site, and a magnification rate of the environmental site.

The display unit is configured to display the virtual sport court according to the position of the standard point, the actual length and width of the environmental site, and the magnification rate of the environmental site.

In an embodiment, the acquisition unit 54 is specifically for:

- acquiring a movement trajectory of the head-mounted device;
- determining a movement trajectory of the second handle relative to the head-mounted device according to the relative position of the second handle and the head-mounted device and the movement trajectory of the head-mounted device; and
- determining the movement trajectory of the second handle in the coordinate system of the head-mounted device according to the movement trajectory of the head-mounted device and the movement trajectory of the second handle relative to the head-mounted device.

In an embodiment, the apparatus 50 further comprises an update module for:

- displaying the mapping relationship;
- receiving a modification instruction to modify the mapping relationship; and
- updating the mapping relationship according to the modification instruction.

In an embodiment, the apparatus 50 further comprises a third display module. The third display module is for:

when it is determined that a hitting action is completed, displaying prompt message indicating to return to a target position of the virtual sport court according to the position of the head-mounted device.

In an embodiment, the apparatus 50 further comprises a correction module. The correction module is for:

before the position of the head-mounted device is not at the target position of the virtual sport court, correcting the target movement velocity ratio to be a target movement velocity ratio when moving from the center position to the hitting position last time.

In an embodiment, the apparatus further comprises a third determination module. The third determination module is for:

at an initial moment of displaying the virtual sport court, determining boundary lines of the virtual sport court according to a distance between the position of the head-mounted device and the ground;

determining whether the virtual ball is out of bounds according to the movement trajectory of the virtual ball and the boundary lines of the virtual sport court.

Device Embodiment

The embodiment of the present disclosure provides an electronic device 60, which comprises a first handle 61, a second handle 62, and a head-mounted device 63. The head-mounted device 63 comprises the apparatus as described in FIG. 5.

Alternatively, the head-mounted device 63 comprises a memory 631 and a processor 632, the memory 631 is configured to store computer instructions, and the processor 632 is configured to call the computer instructions from the memory 631 to execute the method as described in any of the above method embodiments.

Storage Medium Embodiment

The embodiment of the present disclosure provides a computer-readable storage medium having a computer program stored thereon. When the computer program is executed by a processor, the racket ball game method based on a head-mounted device as described in any of the above method embodiments is implemented.

The present disclosure may be a system, a method, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any random appropriate combinations thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcode, firmware instructions, state setting data, or a source code or target code written by any combinations of one or more programming languages. the programming languages include object-oriented programming languages, such as Smalltalk, C++, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described herein with reference to the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

These computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the market, or to enable other skilled persons in the art to understand the embodiments disclosed herein. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A racket ball game method based on a head-mounted device, comprising the following steps:

displaying a virtual sport court and displaying a virtual ball in the virtual sport court;

determining a human body posture according to a relative position of a first handle and the head-mounted device;

searching a database for a target movement velocity ratio that meets one or more predefined matching criteria when compared with a calculated movement velocity ratio representing the human body posture from a mapping relationship according to the human body posture;

acquiring a movement trajectory of a second handle in a coordinate system of the head-mounted device;

determining a virtual movement trajectory of the second handle in the virtual sport court according to the movement trajectory of the second handle in the coordinate system of the head-mounted device and the target movement velocity ratio; and determining a movement trajectory of the virtual ball according to the virtual movement trajectory and the movement trajectory of the virtual ball in the case of being hit or not being hit, and displaying the virtual ball according to the movement trajectory of the virtual ball in the case of being hit or not being hit.

2. The method according to claim 1, wherein the step of displaying the virtual sport court comprises:

acquiring a position of a standard point, a length and width of an environmental site, and a magnification rate of the environmental site; and displaying the virtual sport court according to the position of the standard point, the length and width of the environmental site, and the magnification rate of the environmental site.

3. The method according to claim 1, wherein the step of acquiring a movement trajectory of the second handle in the coordinate system of the head-mounted device comprises:

acquiring a movement trajectory of the head-mounted device;

determining a movement trajectory of the second handle relative to the head-mounted device according to the relative position of the second handle and the head-mounted device and the movement trajectory of the head-mounted device; and determining the movement trajectory of the second handle in the coordinate system of the head-mounted device according to the movement trajectory of the head-mounted device and the movement trajectory of the second handle relative to the head-mounted device.

4. The method according to claim 1, further comprising the following steps:

displaying the mapping relationship;

receiving a modification instruction to modify the mapping relationship; and updating the mapping relationship according to the modification instruction.

5. The method according to claim 1, further comprising the following step:

when it is determined that a hitting action is completed, displaying prompt information indicating to return to a target position of the virtual sport court according to a position of the head-mounted device.

6. The method according to claim 5, further comprising the following steps:

measuring the position of the head-mounted device and judging whether the position matches the target position of the virtual sport court, before the position of the head-mounted device is not at the target position of the virtual sport court, correcting the target movement velocity ratio to be a target movement velocity ratio when moving from the center position to the hitting position last time.

7. The method according to claim 2, further comprising the following steps:

at an initial moment of displaying the virtual sport court, determining boundary lines of the virtual sport court according to a distance between the position of the head-mounted device and the ground;

determining whether the virtual ball is out of bounds according to the movement trajectory of the virtual ball and the boundary lines of the virtual sport court.

8. A racket ball game apparatus based on a head-mounted device, comprising:

a first display module configured to display a virtual sport court and display a virtual ball in the virtual sport court;

a first determination module configured to determine a human body posture according to a relative position of a first handle and the head-mounted device;

a search module configured to search a database for a target movement velocity ratio that meets one or more predefined matching criteria when compared with a calculated movement velocity ratio representing the human body posture from a mapping relationship according to the human body posture;

an acquisition module configured to acquire a movement trajectory of a second handle in a coordinate system of the head-mounted device;

a second determination module configured to determine a virtual movement trajectory of the second handle in the virtual sport court according to the movement trajectory of the second handle in the coordinate system of the head-mounted device and the target movement velocity ratio; and a second display module configured to determine a movement trajectory of the virtual ball according to the virtual movement trajectory and the movement trajectory of the virtual ball in the case of being hit or not being hit, and display the virtual ball according to the movement trajectory of the virtual ball in the case of being hit or not being hit.

9. An electronic device, comprising: a first handle, a second handle, and a head-mounted device, wherein the head-mounted device comprises a racket ball game apparatus based on a head-mounted device, the racket ball game apparatus comprises:

a first display module configured to display a virtual sport court and display a virtual ball in the virtual sport court;

a first determination module configured to determine a human body posture according to a relative position of a first handle and the head-mounted device;

a search module configured to search a database for a target movement velocity ratio that meets one or more predefined matching criteria when compared with a calculated movement velocity ratio representing the human body posture from a mapping relationship according to the human body posture;

an acquisition module configured to acquire a movement trajectory of a second handle in a coordinate system of the head-mounted device;

a second determination module configured to determine a virtual movement trajectory of the second handle in the virtual sport court according to the movement trajectory of the second handle in the coordinate system of the head-mounted device and the target movement velocity ratio; and a second display module configured to determine a movement trajectory of the virtual ball according to the virtual movement trajectory and the movement trajectory of the virtual ball in the case of being hit or not being hit, and display the virtual ball according to the movement trajectory of the virtual ball in the case of being hit or not being hit; or the head-mounted device comprises a memory and a processor, the memory is configured to store computer instructions, and the processor is configured to call the computer instructions from the memory to execute the method according to claim 1.

10. A computer-readable storage medium having a computer program stored thereon, wherein the method according to claim 1 is implemented when the computer program is executed by a processor.

11. The electronic device according to claim 9, wherein the step of displaying the virtual sport court comprises:

acquiring a position of a standard point, a length and width of an environmental site, and a magnification rate of the environmental site; and displaying the virtual sport court according to the position of the standard point, the length and width of the environmental site, and the magnification rate of the environmental site.

12. The electronic device according to claim 9, wherein the step of acquiring a movement trajectory of the second handle in the coordinate system of the head-mounted device comprises:

acquiring a movement trajectory of the head-mounted device;

determining a movement trajectory of the second handle relative to the head-mounted device according to the relative position of the second handle and the head-mounted device and the movement trajectory of the head-mounted device; and determining the movement trajectory of the second handle in the coordinate system of the head-mounted device according to the movement trajectory of the head-mounted device and the movement trajectory of the second handle relative to the head-mounted device.

13. The electronic device according to claim 9, further comprising the following steps:

displaying the mapping relationship;

receiving a modification instruction to modify the mapping relationship; and updating the mapping relationship according to the modification instruction.

14. The electronic device according to claim 9, further comprising the following step:

when it is determined that a hitting action is completed, displaying prompt information indicating to return to a target position of the virtual sport court according to a position of the head-mounted device.

15. The electronic device according to claim 14, further comprising the following steps:

measuring the position of the head-mounted device and judging whether the position matches the target position of the virtual sport court, before the position of the head-mounted device is not at the target position of the virtual sport court, correcting the target movement velocity ratio to be a target movement velocity ratio when moving from the center position to the hitting position last time.

16. The electronic device according to claim 11, further comprising the following steps:

at an initial moment of displaying the virtual sport court, determining boundary lines of the virtual sport court according to a distance between the position of the head-mounted device and the ground;

determining whether the virtual ball is out of bounds according to the movement trajectory of the virtual ball and the boundary lines of the virtual sport court.

17. The computer-readable storage medium according to claim 10, wherein the step of displaying the virtual sport court comprises:

acquiring a position of a standard point, a length and width of an environmental site, and a magnification rate of the environmental site; and displaying the virtual sport court according to the position of the standard point, the length and width of the environmental site, and the magnification rate of the environmental site.

18. The computer-readable storage medium according to claim 10, wherein the step of acquiring a movement trajectory of the second handle in the coordinate system of the head-mounted device comprises:

acquiring a movement trajectory of the head-mounted device;

determining a movement trajectory of the second handle relative to the head-mounted device according to the relative position of the second handle and the head-mounted device and the movement trajectory of the head-mounted device; and determining the movement trajectory of the second handle in the coordinate system of the head-mounted device according to the movement trajectory of the head-mounted device and the movement trajectory of the second handle relative to the head-mounted device.

19. The computer-readable storage medium according to claim 10, further comprising the following steps:

displaying the mapping relationship;

receiving a modification instruction to modify the mapping relationship; and updating the mapping relationship according to the modification instruction.

20. The computer-readable storage medium according to claim 10, further comprising the following step:

when it is determined that a hitting action is completed, displaying prompt information indicating to return to a target position of the virtual sport court according to a position of the head-mounted device.

* * * * *